3,472,768
Patented Oct. 14, 1969

3,472,768
DRILLING MUD SYSTEM
Jack C. Estes and Arthur Park, Tulsa, Okla., assignors to Pan American Petroleum Corporation, Tulsa, Okla., a corporation of Delaware
No Drawing. Filed Apr. 29, 1966, Ser. No. 546,211
Int. Cl. E21b 21/04; C10m 3/02, 3/26
U.S. Cl. 252—8.5    11 Claims

ABSTRACT OF THE DISCLOSURE

Inorganic phosphate salts are proposed as additives to certain surfactants used in heavy oil well drilling muds to reduce differential sticking of drill pipe. The phosphate salts tend to reduce the preferential oil wetting of the barite caused by the surfactants. Potassium and sodium phosphates are used for this purpose. The surfactants employed are prepared from about 4 parts of a half ammonium, half isopropylamine salt of the sulfosuccinic acid ester of the oleic acid amide of isopropanol amine and about 1 part of the isopropylamine salt of dodecyl benzene sulfonic acid.

---

The present invention relates to new and improved compositions useful in freeing drill pipe stuck to the wall of a well by means of differential pressure. More particularly, it is directed to the formulation of anti-differential sticking compositions having the ability to emulsify oil and impart a lubricous quality to common drilling fluid solid particles such that troque, drag, and differential pressure sticking of the drill string in a well are reduced. The lubricity of the drilling fluid solids is caused by the coating of the anti-differential sticking compositions. However, they are chemically balanced in such a way that the coated particles do not become oil-wet in a water base drilling fluid. Oil-wet solid particles in a water base system tend to flocculate and settle out.

Frequently, in drilling operations, particularly at depths in excess of 8,000 feet, the drill pipe becomes stuck and cannot be rotated or removed from the hole. In any hole where the mud pressure is substantially higher than the formation fluid pressure, a mud cake forms opposite the permeable section of the hole and a flow of filtrate passes through the mud cake and into the formation, thus thickening the mud. It has been previously observed that a pressure differential from the well bore to a permeable formation covered with mud cake can hold the pipe next to the well bore wall with great force. This occurs when a portion of the pipe rests against the wall of the well, embedding itself in the filter cake. The area of the drill pipe in contact with the cake is thus sealed off from the full hydrostatic pressure of the mud column. The pressure difference between the mud column pressure and the formation pressure acts on the area of drill pipe in contact with the mud cake to hold the pipe against the wall of the hole. The degree to which this phenomenon occurs depends on a number of factors, such as mud weight, the permeability of the formation, the area of contact of the pipe with the mud cake, fluid loss properties of the mud, the time that the pipe remains in contact with the thickened filter cake, etc.

It has previously been suggested that surface-active agents be employed in drilling muds to solve the problem of differential sticking. In our investigation, however, we found that the kind of surface-active material capable of solving this problem is very limited. The fact that a certain composition possesses excellent surface-active properties is not necessarily any criterion that it will function satisfactorily in the freeing of differentially stuck drill pipe. For example, a good additive for our purposes should (1) be highly compatible with bentonite and other components of drilling muds, (2) show good stability at temperatures up to about 350° F., (3) be resistant to solids contamination, and (4) not cause severe increases in gel strength and viscosity.

In U.S. 3,223,622 a number of anti-differential sticking agents are described. We have found, however, that such agents, while effective to reduce differential sticking, tend to degrade the mud systems in which they are used because of the pronounced tendency in most cases for the oil present to wet the barite in the mud causing the former to flocculate and settle in the well bore. In the mud pit, barite, and sometimes bentonite as well, becomes oil-wet and settles out causing the mud system to become unbalanced and ineffective. This difficulty has been found to exist particularly in the case where the anti-differential sticking agent is a complex amine sulfonate (hereinafter sometimes referred to as Additive 1) of the type described and claimed in the abovementioned patent. It would appear that a solution to this problem requires a reduction by some means of the tendency of these anti-differential sticking agents to cause barite to become oil-wet. Oil-wetting of the barite in drilling mud offsets the normal tendency for barite to be supported or suspended by its attraction for other water-wet particles in the mud, such as bentonite and clays. When the barite becomes oil-wet the individual particles thereof lose their supporting action, and being heavier than the other components of the system, tend to settle out.

Accordingly, it is an object of our invention to provide an anti-differential sticking agent which when added to drilling fluids, particularly the high density muds, will cause the barite or equivalent material in said fluids to retain its water-wet characteristics and still be coated with anti-sticking agent. It is still another object of our invention to provide an anti-differential sticking agent that also has the ability to reduce the fluid loss of mud, reduce sloughing shale, and to reduce the torque on the drill string.

We have now discovered that the use of certain inorganic water-soluble phosphates in conjunction with a complex amine sulfonate, of the type disclosed in U.S. 3,223,622, renders the resulting mixture very effective in preventing the oil-wetting of both bentonite and barite present in a wide range of drilling mud systems. The complex amine sulfonate referred to above is prepared from about four parts of a half ammonium, half isopropylamine salt of the sulfosuccinic acid ester of the oleic acid amide of isopropanol amine and about one part of the isopropylamine salt of dodecyl benzene sulfonic acid. Further particulars on the prepartion of this latter compound are disclosed in U.S. 2,976,209. For convenience this compound is hereinafter referred to as "complex amine sulfonate." This material is generally used in the form of a propyl alcohol solution wherein the active ingredients range in concentration from about 50 to about 80 weight percent.

While the inorganic water-soluble phosphates prevent the oil-wetting of barite in drilling muds, we have found that the organic phosphates, when combined with the aforesaid complex amine sulfonate, do not impart to a drilling fluid system the degree of stability required to maintain the barite in suspension. Actually, the preferred group of phosphates is limited to the potassium and sodium phosphates, such as monosodium phosphate, disodium phosphate, potassium tripoly phosphate, etc. Although standard phosphate mud thinners, such as sodium acid pyrophosphate and sodium hexametaphosphate, also function to prevent undesirable oil-wetting of the barite, precautions should be taken in the use of such materials because the gel strength of the mud can be lowered to the extent that barite can settle. In this connection the term "water-soluble inorganic phosphate," as used in the present claims, is intended to be restricted to phosphates of the types mentioned in this paragraph.

The phosphates employed in our invention cannot be combined directly with the complex amine sulfonates because they are not soluble in the propyl alcohol solutions of the sulfonates. It is therefore desirable to prepare an aqueous solution of the phosphate in order to combine it with the sulfonate solution. There is a maximum amount of the phosphate for a given ratio of water to sulfonate solution that can be combined in this manner to give a clear solution. The addition of ethylene glycol, propylene glycol, or similar compounds, increases the maximum amount of phosphate that can be combined with a given water to sulfonate ratio.

The following four formulas indicate the maximum amount of monosodium phosphate, for example, that can be combined with the amine sulfonate to water ratio of 2.22 containing different amounts of ethylene glycol and still maintain a clear, stable solution.

TABLE I

| Ingredient | Formula "A" (ml.) | Wt., grams | Wt., percent | Formula "B" (ml.) | Wt., grams | Wt., percent |
|---|---|---|---|---|---|---|
| Water | 30 | 30.00 | 26.87 | 30 | 30.00 | 25.06 |
| Monosodium phosphate | [1] 15 | 15.00 | 13.44 | [1] 17.5 | 17.50 | 14.62 |
| Glycol, Sp. Gr. 1.11 | 0 | 0.00 | 0 | 5 | 5.55 | 4.64 |
| Complex amine sulfonate, Sp. Gr. 0.98 | 68 | 66.64 | 59.69 | 68 | 66.64 | 55.68 |

| Ingredient | Formula "C" (ml.) | Wt., grams | Wt., percent | Formula "D" (ml.) | Wt., grams | Wt., percent |
|---|---|---|---|---|---|---|
| Water | 30 | 30.00 | 23.36 | 30 | 30.00 | 21.85 |
| Monosodium phosphate | [1] 20.7 | 20.70 | 16.12 | [1] 24 | 24.00 | 17.48 |
| Glycol, Sp. Gr. 1.11 | 10 | 11.10 | 8.64 | 15 | 16.65 | 12.13 |
| Complex amine sulfonate, Sp. Gr. 0.98 | 68 | 66.64 | 51.88 | 68 | 66.64 | 48.54 |

[1] Grams.

Formulas containing greater amounts of phosphate have less tendency for oil-wetting but also have less anti-differential sticking activity because of a lower percentage amount of the complex amine sulfonate. However, when excessive concentrations of phosphate are present, the system becomes cloudy and unstable and on standing the mixture separates into two layers and becomes ineffective. Ordinarily we prefer to employ phosphate concentrations in our new compositions ranging from about 10 to about 18 weight percent, depending, of course, on the amount of glycol present. The use of glycol in our preferred compositions not only permits a higher concentration of phosphate to go into solution in the additive, but also functions to stabilize the system by preventing the organic components thereof from coming out in a separate phase when mixed with the phosphate solution. The above formulas result in a clear, light straw-colored, homogeneous liquid stable over a wide range of temperatures for indefinite storage periods. Amounts of sodium phosphate greater than those shown will result in cloudy, two-phase systems. In order to form the homogeneous solution, the complex amine sulfonate and the phosphate solution, which may or may not contain the glycol, are mixed slowly with agitation. In this connection it should be strictly understood that the compositions contemplated herein, whether with or without glycol, must be essentially clear solutions. As previously indicated, mixtures that are cloudy are unstable and lead to unsatisfactory results.

A typical composition we have found well suited to field operations has the following composition: 52 percent complex amine sulfonate, 12 percent monosodium phosphate, 8 percent ethylene glycol, and 28 percent water, all percentages being by weight. This concentration of glycol not only is helpful to maintain a maximum phosphate concentration in the system and to prevent the aforesaid complex from forming a separate phase, but the pourability of the composition is maintained to a temperature of −30° F.

The additive of our invention may be employed in amounts ranging from about 0.125 to about 10 pounds per barrel of mud, depending upon the amount of solids in the mud; the usual concentration is about 1 to about 5 pounds per barrel. The additive may be used in concentrations greater than those stated; however, no appreciable benefit is generally produced by the presence of amounts over that needed to coat the mud solids.

In testing the ability of this additive to prevent oil-wetting of the barite, while at the same time serving as an anti-differential sticking agent, a fluid loss reducer, an agent to reduce torque and drag on the drill stem, and as a means to control sloughing shale, a heavy mud was prepared as follows: 5 weight percent of bentonite was added to water and aged at room temperature for one week. Thereafter, 4 pounds per barrel of sodium lignosulfonate and 1 pound per barrel of 20 weight percent caustic solution were added and the mud stirred for about 5 minutes. To this mixture was then added 587 pounds per barrel of barite (to weight the mud up to 15 pounds per gallon) and 0.35 pound per barrel of 20 weight percent caustic solution. This mixture was again agitated for an additional 5 minutes, 5 percent by volume of diesel oil added, and then stirred for 10 minutes.

Using mud prepared as described immediately above, tests were conducted in accordance with the following sequence. Additive 1 and our new additive were introduced into separate volumes of the test mud in a concentration of 2 pounds per barrel and the mud stirred for an additional 30 minutes with a slow-speed mixer operating at 500 r.p.m. In these tests the 30-minute stirring time is important since it requires from 15 to 30 minutes to determine whether or not the phenomenon of oil-wetting is going to occur. Oil-wetting tendencies were checked by observing the condition of the mud system and also diluting a small sample in a watchglass (1½ cc. of mud in 50 cc. of water). In order to determine the flocculation state of the barite, the number code in Table II was established to conveniently described the oil-wet condition of the mud.

TABLE II

| Code | Description |
|---|---|
| 0 | Normal mud, no flocculation shown on watchglass. |
| 1 | Normal mud but slight, light gray flocculation appears when diluted on watchglass. |
| 2 | Darker mud appearance, moderate dark gray flocculation on watchglass but no oil-wetting. |
| 3 | Dark, thick appearance of mud system, moderate dark flocculation of oil-wet barite on watchglass. |
| 4 | Severe flocculation of the mud system itself caused by oil-wetting of both barites and clays. |

Conditions 0 and 1 are normal with slight flocculation on the watchglass, meaning only a larger apparent size of the barite particles. Condition 2 characterized by a darker appearance and higher apparent viscosity of the mud system requires careful attention as large additions of water, oil, bentonite, barite, or additives may cause the mud to progress to conditions 3 or 4 in a mud which shows a severe tendency for oil-wetting.

It has been our observation that the type of dispersant employed in the drilling mud can have a pronounced effect on the tendency of the barite therein to become oil-wet. Thus, with the same general kind of dispersant, i.e., lignosulfonates, we have found the oil-wetting tendency of the mud—prior to incorporation of our additive—to vary with the brand of lignosulfonate used. For example, when employing Additive 1 in a concentration of 2 pounds per barrel in a 15 pounds per gallon mud, the oil-wetting tendency of the mud varied from slight to severe, depending upon the manufacturing source of the lignosulfonate dispersant.

Additional studies were made to determine the effect of oil concentration on the tendency of barite in the test mud to become oil-wet. Such tests were run with oil concentrations ranging from 0 to 12 volume percent in a 15 pounds per gallon mud exhibiting a severe oil-wetting tendency. After the mud samples were mixed, 500 cc. of each sample was pumped at 180 cc. per second in constant circulation for 20 minutes. This subjected the mud to high shear and a gradual temperature rise to 150° F. Oil-wetting tendencies of Additive 1 and the composition of our invention were then checked. The results obtained with the two different muds, both before and after pumping, are shown in Table III below. Each of the test muds contained the respective anti-differential sticking agent in a concentration of 2 pounds per barrel.

TABLE III

| Oil Concentration, volume percent | Additive 1 [1] | | New additive [1] | |
|---|---|---|---|---|
| | After mixing | After pumping | After mixing | After pumping |
| 0 | 1 | 2 | 0 | 2 |
| ¼ | 1 | 2 | 0 | 2 |
| ½ | 1 | 2 | 0 | 2 |
| 1 | 2 | 3 | 0 | 2 |
| 2 | 2 | 3 | 0 | 2 |
| 4 | 3 | 4 | 1 | 2 |
| 8 | 3 | 4 | 1 | 2 |
| 12 | 4 | 4 | 2 | 3 |

——— Indicates beginning of oil-wetting condition.
[1] Mud condition expressed in accordance with code in Table II.

The above table shows that as little as 1 percent oil caused oil-wetting using Additive 1 in this mud system, but that a concentration of 12 percent oil was required before oil-wetting occurred using mud containing our new additive. In actual operations, the oil content of these muds ranges from about 4 to 8 percent, typically 6 percent. As previously pointed out, the oil-wetting tendency of the various high density muds we have worked with is to an important degree dependent upon the type of lignosulfonate employed. The mud on which the data in Table III were based employed a lignosulfonate which gave rise to very severe oil-wetting characteristics. Thus, higher oil concentrations in the mud could be tolerated if other types of lignosulfonates were substituted for those having a strong tendency to oil-wet barite. While the oil-wetting tendencies of a good anti-differential sticking agent should not be sufficiently pronounced to cause oil-wetting of the barite, some oil-wetting characteristics are desirable to provide the properties of "slicking up" the mud filter cake and drill string in the well bore to reduce torque. The tests performed on muds of the type contemplated by our invention indicate that the phosphate additive does an effective job in this regard at reasonable oil concentrations, i.e., 4 to 8 percent, even in a mud having severe oil-wetting tendencies.

Tests in weighted and unweighted muds show that viscosity properties are not adversely affected by our new additive and that reductions in fluid loss are about the same as those experienced with Additive 1. In general, the reduction in differential sticking is slightly less because of the reduced tendency for oil-wetting. A comparison of mud properties obtained using Additive 1 and our new additive in a 15 pounds per gallon mud having a pronounced tendency to oil-wet barite is shown in the table below. In the mud samples tested, the anti-differential sticking agent in each case was added in the concentration of 2 pounds per barrel. The reduction in pull-out force was determined on a low pressure differential sticking device, such as that described in "Drilling and Production Practice," p. 55, by W. E. Helmick and A. J. Longley, presented by A. J. Longley at the Spring Meeting of the Pacific Coast District, Division of Production of the American Petroleum Institute, Los Angeles, Calif., May 1957. In testing the performance of these additives under drilling conditions, a differential pressure of 28 inches of mercury was applied for 10 minutes across the interface between the mud and the formation. The drill pipe was next forced against the resulting mud cake for a period of 10 minutes. Thereafter, the amount of force (in pounds) required to free the stuck pipe was measured.

TABLE IV

| Characteristic | Additive 1 | New Additive |
|---|---|---|
| Oil-wetting | Moderate to severe | None to slight. |
| Viscosity | Increases with oil-wetting. | Little change. |
| Average pull-out reduction. | 20–35 percent | 20–35 percent. |
| Average fluid loss reduction. | 25–40 percent | 25–40 percent. |
| Average foam [1] on 500 cc. heavy mud. | ⅜″ | ⅜″. |
| Average foam [1] on 500 cc. light mud. | ¾″ | 1⅛″. |

[1] After 10 minutes stirring in Hamilton Beach mixer.

It will be seen from the data in the table that muds containing the new additive of our invention not only retain all of the desirable properties of muds containing Additive 1, but are definitely superior in preventing oil-wetting of the barite while maintaining viscosity in the desired range.

The problem of dealing with the phenomenon of differential sticking can be approached from either of two ways. If the drill pipe is stuck, a batch of mud, diesel or crude oil, containing 3 to 10 pounds per barrel of our additive, may be run down the drill pipe and back up the annulus to a level slightly above the highest point in the hole where sticking occurs. Force is then applied to the pipe by attempting to rotate it or work it free. Usually within 4 to 24 hours the pipe is free, depending on how bad it is stuck.

Our additive may also be used in the mud as a preventative for differential sticking, in which case it is incorporated in the mud system during circulation in a concentration of from about 0.5 to about 5 pounds per barrel. This concentration of additive should be maintained in the mud system. The introduction of more additive to the mud should be made when the fluid loss exceeds the original value by about 2 to 3 cc. for 30 minutes, as determined by the standard API test. Gradual additions of the additive are made until the fluid loss value is reduced to the desired level.

The watchglass test method, referred to above, may also be used to determine if there is an effective amount of the additive in the mud system. A sample of the mud is tested before the additive is added. This sample should result in code 0 as described in Table II. As the additive is being added, flow line samples of the mud should be tested periodically. When tests of these samples result in code 1 as described in Table II, there is an effective amount of the additive present in the mud system.

A further advantage of the anti-differential sticking additive of our invention resides in its behavior while drilling through water-sensitive shale formation. It is well recognized that ordinarily when drilling in such formations at elevated temperatures, fluid loss characteristics of the mud deteriorate rapidly which in turn causes the shale to slough, resulting oftentimes in stuck drill pipe. Fluid loss of Q-Broxin muds tested at 300° F. and 500 p.s.i. frequently amounts to as much as 30 cc. in 30 minutes or even higher.

A case history of a specific well drilled in an area where severe shale sloughing is a very common problem will illustrate the value of our new additive in this regard. This well was located in the South Pecan Lake Field, Louisiana, and was drilled to a depth of 14,435 feet before the mud was treated with our new additive in a concentration of 2 pounds per barrel. Thereafter it was found that the resulting mud, having a density of 16 pounds per gallon, effectively controlled shale sloughing and stabilized the hole so that no difficulty was encountered in logging and running casing. There was no evidence or differential sticking nor was there evidence that the diesel oil, present in the mud in a concentration of 6 volume percent, exhibited any tendency to oil-wet the barite. In the particular area where this well was being drilled, the shale formation is notorious for sloughing and, based on prior experience in offset wells, it would have been a practical impossibility to drill with a water base mud without sticking the drill pipe. This particular well after incorporating our new additive into the mud was drilled to a total depth of 14,625 feet at which point the well started to "kick." It was then put on choke with the blowout preventer closed. The drill pipe was worked up and down at several intervals during the next 8 hours with no evidence of sticking or sloughing shale. The mud remained at a constant 16 pounds per gallon. It was the opinion of field personnel that such stable hole conditions were a direct result of the effectiveness of our new additive in controlling the shale sloughing problem which had been severe in drilling the same formations in offset wells.

A comparison of the properties of the mud used in the South Pecan Lake well before and after addition of our new additive is shown in the table below:

TABLE V

| Properties | Base mud | With new additive (2 lbs./bbl.) |
| --- | --- | --- |
| Depth | 14,435 | 14,541 |
| Wt. of mud, lbs./gal | 16.0 | 16.0 |
| Funnel viscosity | 53 | 49 |
| Apparent viscosity, cp | 48 | 41 |
| Plastic viscosity, cp | 42 | 36 |
| Yield point, lbs./100 sq. ft | 12 | 10 |
| Gel strength, initial | 0 | 0 |
| Gel strength, 10 min | 2 | 0 |
| API fluid loss | 3.0 | 3.0 |
| Cake thickness, 32nds inch | 1 | 1 |
| Oil content, percent by vol | 5 | 6 |
| Solids content, percent by vol | 31 | 31 |

The viscosity and gel properties shown for mud treated with the new additive are lower than those of the base mud. The normal effect of our additive is to increase these properties to a slight extent, therefore, the viscosity and gel strength reductions obtained are attributed to dispersing agents which were added after the mud was treated with our additive. The data show that addition of 2 pounds per barrel of the new additive left the API fluid loss unchanged at 3.0 cc. This is somewhat misleading since mud from the settling tank, which had a higher fluid loss, was mixed in with the mud containing our new additive. A study of the data indicates that the mud treatment of 2 pounds per barrel of our new additive reduced fluid loss approximately 0.2 cc.

The expression "heavy mud" or "heavy drilling fluid," as used herein, is intended to mean a drilling fluid which, in addition to water, contains a material such as barite which serves as a weighting agent. Also, these heavy muds contain a viscosity dispersing agent such as chrome or ferro chrome lignin salts plus sufficient caustic to dissolve the lignin salts. These muds generally have a density of at least 12 lbs./gal. and have a pH usually in the range of 8 to 13. These may also contain a weighting agent such as galena to bring the weight of the mud up to a maximum of about 20 to 25 pounds per gallon. To such muds our invention contemplates the addition of from about 2 to about 20 volume percent of a hydrocarbon ranging in type from diesel oil to asphalt. Ordinarily, we prefer to use such hydrocarbon materials in an amount corresponding to from about 4 to 10 volume percent. Muds of the above general composition when combined with the new additives of our invention in the concentrations taught herein result in a drilling fluid possessing excellent anti-differential sticking characteristics. They also exhibit good fluid loss properties. Although our additive was developed primarily for heavy muds, its use is not restricted to them. Excellent results have been obtained in the field using our additive in unweighted muds to control shale sloughing and to reduce torque and drag on the drill string.

We claim:
1. A drilling fluid additive for the prevention of oil wetting of the barite present in an aqueous drilling fluid, said additive comprising essentially a substantially clear homogeneous mixture of a water-soluble phosphate selected from the group consisting of monosodium phosphate, disodium phosphate, potassium tripoly phosphate, sodium hexametaphosphate, and sodium acid pyrophosphate wherein said phosphate is present in an amount ranging from about 10 to about 18 weight percent, and from about 48 to about 60 weight percent of a surface active agent prepared from about 4 parts of a half ammonium half isopropylamine salt of the sulfosuccinic acid ester of the oleic acid amide of isopropanol amine and about 1 part of the isopropylamine salt of dodecyl benzene sulfonic acid.

2. The additive of claim 1 to which a minor amount of a water miscible glycol has been added.

3. The additive of claim 2 in which the glycol employed is ethylene glycol.

4. The additive of claim 3 wherein said surface-active agent is employed in the form of an isopropyl alcohol solution containing said agent in a concentration of from about 50 to about 80 weight percent.

5. The additive of claim 3 wherein the phosphate employed is monosodium phosphate.

6. The drilling fluid additive of claim 1 in which the phosphate employed is monosodium phosphate.

7. An aqueous drilling fluid containing barite and dispersed oil and having incorporated therein an additive for the prevention of oil wetting of the barite present in said fluid, said additive comprising essentially a substantially clear homogeneous aqueous mixture of a water-soluble phosphate selected from the group consisting of monosodium phosphate, disodium phosphate, potassium tripoly phosphate, sodium hexametaphosphate, and sodium acid pyrophosphate, said phosphate being present in an amount ranging from about 10 to about 18 weight percent, and from about 48 to about 60 weight percent of a surface active agent prepared from about 4 parts of a half ammonium half isopropylamine salt of the sulfosuccinic acid ester of the oleic acid amide of isopropanol amine and about 1 part of the isopropylamine salt of dodecyl benzene sulfonic acid.

8. An aqueous drilling fluid containing barite and a dispersed oil and having incorporated therein the additive of claim 1 in a concentration of from about 0.125 to about 10 lbs./bbl.

9. An aqueous drilling fluid containing barite and a dispersed oil and having incorporated therein the additive of claim 1 in a concentration of from about 1 to 5 lbs./bbl.

10. An aqueous drilling fluid containing barite and a dispersed oil and having incorporated therein the additive defined in claim 2.

11. An aqueous drilling fluid containing barite and a dispersed oil and having incorporated therein the additive defined in claim 6.

References Cited

UNITED STATES PATENTS

| | | | |
|---|---|---|---|
| 2,294,877 | 9/1942 | Wayne | 252—8.5 |
| 2,335,146 | 11/1943 | Ford et al. | 252—8.5 |
| 2,555,794 | 6/1951 | Henkes | 252—8.5 |
| 2,976,209 | 3/1961 | Lindner | 252—152 X |
| 3,223,622 | 12/1965 | Lummus et al. | 252—8.5 |
| 3,297,569 | 1/1967 | Lummus | 252—8.5 |
| 2,292,267 | 8/1942 | Garrison | 252—8.5 |
| 2,315,995 | 4/1943 | Williams | 252—8.5 |

HERBERT B. GUYNN, Primary Examiner